United States Patent
Ito et al.

(10) Patent No.: US 6,991,742 B2
(45) Date of Patent: Jan. 31, 2006

(54) MN-ZN FERRITE AND COIL COMPONENT WITH MAGNETIC CORE MADE OF SAME

(75) Inventors: Kiyoshi Ito, Iwata-gun (JP); Osamu Kobayashi, Iwata-gun (JP); Yukio Suzuki, Iwata-gun (JP)

(73) Assignee: Minebea Co., Ltd., Nagano (JP)

( * ) Notice: Subject to any disclaimer, the term of this patent is extended or adjusted under 35 U.S.C. 154(b) by 386 days.

(21) Appl. No.: 10/214,326

(22) Filed: Aug. 8, 2002

(65) Prior Publication Data

US 2003/0059365 A1    Mar. 27, 2003

(30) Foreign Application Priority Data

Aug. 22, 2001   (JP) ............................. 2001-251472

(51) Int. Cl.
*C04B 35/26*   (2006.01)
*B22F 1/00*   (2006.01)

(52) U.S. Cl. .................... 252/62.62; 335/296; 335/297
(58) Field of Classification Search ............. 252/62.62; 335/296, 297

See application file for complete search history.

(56) References Cited

U.S. PATENT DOCUMENTS

| | | | | |
|---|---|---|---|---|
| 5,846,448 A | * | 12/1998 | Yasuhara et al. | ........ 252/62.56 |
| 6,547,984 B2 | * | 4/2003 | Kobayashi et al. | ...... 252/62.62 |
| 6,767,478 B2 | * | 7/2004 | Ito et al. | .................. 252/62.62 |
| 2002/0008336 A1 | * | 1/2002 | Otobe et al. | ................ 264/612 |

FOREIGN PATENT DOCUMENTS

| | | |
|---|---|---|
| EP | 1 101 736 A1 | 5/2001 |
| JP | A 08-169756 | 7/1996 |
| JP | A 9-237709 | 9/1997 |
| JP | A 10-64716 | 3/1998 |
| WO | WO98/32140 | 7/1998 |

* cited by examiner

*Primary Examiner*—C. Melissa Koslow
(74) *Attorney, Agent, or Firm*—Oliff & Berridge, PLC

(57) ABSTRACT

A Mn—Zn ferrite and a coil component are provided which obtains a low core loss in a frequency band above 1 MHz and even above 5 MHz and which can duly function in such a high frequency band. The Mn—Zn contains as basic components 44.00 to 50.0 mol % $Fe_2O_3$ (50 mol % excluded), 4.0 to 26.5 mol % ZnO, and remainder MnO, and has a dielectric loss tan δ of 0.3 or less at 1 kHz, and a complex relative permittivity $\epsilon$ of 1,000 or less at 1 MHz, whereby a core loss decreases in the high frequency band.

4 Claims, No Drawings

MN-ZN FERRITE AND COIL COMPONENT WITH MAGNETIC CORE MADE OF SAME

BACKGROUND OF THE INVENTION

1. Filed of the Invention

The present invention relates to a Mn—Zn ferrite and a coil component including a magnetic core made of the Mn—Zn ferrite, and particularly to a Mn—Zn ferrite and a coil component suitable for switching power supplies, noise filters, choke coils, and so forth.

2. Description of the Related Art

Switching power supplies have conventionally been used in a frequency band ranging from 100 to 200 kHz. Along with the frequency of electronic equipments such as information communications equipments becoming higher, the frequency band for the equipments is becoming increasingly higher (exceeding 1 MHz). In order for a switching power supply to duly function in such a high frequency band, core loss of materials of the switching power supply must be kept low through up to the high frequency band. The core loss is generally divided into hysteresis loss, eddy current loss and residual loss, and if any one of these losses increases, the core loss increases, making it difficult to use the power supply in the high frequency band above mentioned. Conventionally, a Mn—Zn ferrite has been generally used as a material for transformers and choke coils for a switching power supply. However, since the general purpose Mn—Zn ferrite, though its hysteresis and residual losses are small, has a large eddy current loss, the core loss increases rapidly in a high frequency band.

Japanese Patent Laid-open No. 9-237709 discloses a Mn—Zn ferrite, which contains 0.005 to 0.1 wt % $SiO_2$ and 0.01 to 0.3 wt % CaO as additives in addition to basic components of 50.0 to 60.0 mol % $Fe_2O_3$, 8.0 mol % or less ZnO and the remainder MnO, and which has its core loss at 2 MHz decreased to 500 kW/m$^3$ or less.

In the Mn—Zn ferrite disclosed, complex relative permittivity $\epsilon$ at 2 MHz described and discussed in the claims and embodiments of the laid-open Japanese Patent is very large, ranging from 10,000 to 1,000,000. Such a large complex relative permittivity $\epsilon$ at 2 MHz is supposed to make it absolutely impossible that the complex relative permittivity $\epsilon$ to measures 1,000 or less at 1 MHz, resulting in that electrical resistance decreases significantly in a high frequency band above 1 MHz thereby increasing eddy current loss and failing to realize a low core loss in a high frequency band above 5 MHz.

Japanese Patent Laid-open No. 10-64716 discloses a Mn—Zn ferrite, which contains no ZnO, and which has a core loss of 500 kW/m$^3$ or less at 3 MHz. The Mn—Zn ferrite, however, has a very large complex relative permittivity $\epsilon$ ranging from 10,000 to 1,000,000 at 3 MHz and it is presumed that a low core loss cannot be realized in a high frequency band exceeding 5 MHz as is the case with the aforementioned Mn—Zn ferrite.

SUMMARY OF THE INVENTION

The present invention has been made in light of the above conventional art background, and its object is to provide a Mn—Zn ferrite which retains a low core loss in a high frequency band exceeding 1 MHz and also even 5 MHz and which thereby can duly function in that high frequency band, and to provide also a coil component using the Mn—Zn ferrite.

It is known that in such a high frequency band as exceeding 1 MHz, eddy current loss and residual loss, which, together with hysteresis loss, constitutes a total loss of ferrite core (magnetic core), accounts for 80% or more of the total loss.

Since the eddy current loss is a loss component which is proportional to a square of frequency and inversely proportional to electrical resistance, the electrical resistance of a ferrite core must be increased to decrease the eddy current loss. The recent researches by the present inventors and others have revealed that in a low frequency band of 100 to 200 kHz, the eddy loss can be decreased by increasing the direct current resistance, but that in a high frequency band exceeding 1 MHz, complex relative permittivity $\epsilon$ must be decreased to decrease the eddy loss. Incidentally, decreasing complex relative permittivity reduces an electrical connection between a coil and a core, thereby reducing heat generated from capacitance elements, skew of signal wave, or the like.

The residual loss is partly dependent on dielectric los tan $\delta$ of a core. Complex relative permittivity $\epsilon$ is expressed in the formula: $\epsilon=\epsilon'-j\epsilon''$, where $\epsilon'$ is a real part of complex relative permittivity, and $\epsilon''$ is an imaginary part of complex relative permittivity. The real part $\epsilon'$ of complex relative permittivity indicates degree of polarization of electons taking place in crystal at the same phase as applied electric field when an AC electric field is applied. The imaginary part $\epsilon''$ of complex relative permittivity indicates a component subjected to polarization of electrons with its phase behind with respect to the applied electric field, and, in the ferrite, decreases with increasing of insulativeness of crystal grain boundary. In the conventional Mn—Zn ferrite, $\epsilon''/\epsilon'$ is 0.5 to 1.5, or more. Accordingly, the dielectric loss tan $\delta$ of a ferrite core must be decreased to decrease the residual loss.

The present invention has been made based on the above information, and the Mn—Zn ferrite according to the present invention includes basic components of 44.0 to 50.0 mol % $Fe_2O_3$ (50.0 mol % excluded), 4.0 to 26.5 mol % ZnO, and the remainder MnO, and has a dielectric loss tan $\delta$ of 0.3 or less at 1 kMz and at the same time a complex relative permittivity $\epsilon$ of 1,000 or less at 1 MHz. And a coil component according to the present invention includes a magnetic core made of the above Mn—Zn ferrite.

Since the Mn—Zn ferrite and the coil component thus composed have a dielectric loss tan $\delta$ of 0.3 or less at 1 kHz, the residual loss decreases, and therefore the core loss decreases overall in a high frequency band of 1 kHz to 5 MHz. And, since they have a complex relative permittivity $\epsilon$ of 1,000 or less at 1 MHz, the eddy current loss decreases, and therefore the core loss is held from increasing in a high frequency band above 1 MHz. As a result, The Mn—Zn ferrite has a low core loss and provides a small electrical connection in a high frequency band above 1 MHz, and further above 5 MHz.

The Mn—Zn ferrite and the coil component of the present invention may contain as additives in addition to the above basic components at least one of the following groups: at least one of 0.01 to 0.2 mass % CaO, 0.005 to 0.05 mass % $SiO_2$, and 0.01 to 0.1 mass % $V_2O_5$; at least one of 0.01 to 4.0 mass % $SnO_2$ and 0.01 to 3.0 mass % $TiO_2$; and at least one of 0.01 to 2.0 mass % CuO, 0.01 to 2.0 mass % NiO, 0.01 to 2.0 mass % MgO, 0.01 to 2.0 mass % CoO, 0.01 to 2.0 mass % $Al_2O_3$, and 0.01 to 2.0 mass % $Cr_2O_3$.

DESCRIPTION OF THE PREFERRED EMBODIMENTS

The Mn—Zn ferrite of the present invention has, as above described, a basic component composition of 44.0 to 50.0 mol % $Fe_2O_3$ (50.0 mol % excluded), 4.0 to 26.5 mol % ZnO, and the remainder MnO, and is manufactured such that respective material powders mixed with respective components adjusted to have the above composition are pressed into toroidal cores (green cores), and then the green cores are sintered and cooled thereafter either in an atmosphere containing a suitable amount of oxygen, or in an atmosphere obtained by the expression shown below with the constant b set to an appropriate value between 6 and 21. The constant b is set to range from 6 to 21 for the following reasons. If the constant b is larger than 21, the atmosphere obtained is practically the same as the room air, which does not give justification in specifying oxygen concentration. And in order to make initial permeability of the Mn— Zn ferrite high in a low frequency band, the constant b is required to be as small as possible, but if it is smaller than 6, FeO is produced in a large amount, increasing complex relative permittivity. In view of the purpose of the present invention, iron content in the form of FeO in the ferrite is preferred to be less than 1 mol %.

$$\text{Log } Po_2 = \{-14,540/(T+273)\} + b \qquad (1)$$

where T is temperature (° C.), and $Po_2$ is relative partial pressure of oxygen (-). As described above, if the constant b is set to be larger than 21, the atmosphere is practically the same as the room air, and if it is set to be smaller than 6, the dielectric loss tan δ and the complex relative permittivity ε increase.

In the Mn—Zn ferrite of the present invention, $Fe_2O_3$ content of less than 44.0 mol % causes the initial permeability and the saturation magnetic flux density to significantly decrease, and $Fe_2O_3$ content of more than 50.0 mol % causes the dielectric loss tan δ at 1 kHz to exceed 0.3 and the complex relative permittivity ε at 1 MHz to exceed 1,000. Therefore, the $Fe_2O_3$ content is set to range from 44.0 to 50.0 mol % (50.0 mol % excluded). With the $Fe_2O_3$ content set to the above range, the Mn—Zn ferrite, when sintered in the atmosphere containing a suitable amount of oxygen or the atmosphere having oxygen concentration obtained based on the above expression (1) with the constant b set appropriately to 6 to 21, has a dielectric loss tan δ of 0.3 or less at 1 kHz and a complex relative permittivity ε of 1,000 or less at 1 MHz. As a result, the Mn—Zn ferrite has a low core loss in a high frequency band above 1 MHz, and further above 5 MHz, and also has a small electrical connection between a coil and a core.

In the Mn—Zn ferrite of the present invention, the magnetic properties such as initial permeability and saturation magnetic flux density may be varied without causing a problem with practical use, as long as the characteristics of the dielectric loss tan δ and the complex relative permittivity ε are satisfied. But, since ZnO content of less than 4.0 mol % cause the initial permeability to significantly decrease, and since ZnO content of more than 26.5 mol % causes the saturation magnetic flux density to significantly decrease, the ZnO content is set to range from 4.0 to 26.5 mol %.

The Mn—Zn ferrite of the present invention may contain, in addition to the basic components, at least one of 0.01 to 0.2 mass % CaO, 0.005 to 0.05 mass % $SiO_2$, and 0.01 to 0.1 mass % $V_2O_5$ as additives. In this case, the CaO, $SiO_2$ and $V_2O_5$ may be originally CaO, $SiO_2$ and $V_2O_5$, respectively, or may be compounds which, when sintered, turn into CaO, $SiO_2$ and $V_2O_5$, respectively. When any one of these oxides or compounds is added alone by itself, the amount of addition is set to range as above described in terms of mass ratio with the amount converted into CaO, $SiO_2$ and $V_2O_5$. When at least two of the oxides or compounds are added in combination, the total amount of addition is desirably set to range from 0.02 to 0.2 mass % in terms of mass ratio with the amount converted into CaO, $SiO_2$ and $V_2O_5$.

The components of CaO, $SiO_2$ and $V_2O_5$ are effective in increasing the resistance of the ferrite crystal grain boundary, thereby decreasing the dielectric loss tan δ at 1 kHz. Too small amount of addition of the components lessens the effectiveness, and too large amount of addition not only causes the initial permeability and the saturation magnetic flux density to significantly decrease but also causes the complex relative permittivity ε at 1 MHz to significantly increase. Therefore, the amount of addition is set to range as above defined.

The Mn—Zn ferrite of the present invention may contain, in addition to the basic components with or without the preceding additive group, at least one of 0.01 to 4.0 mass % $SnO_2$ and 0.01 to 3.0 mass % $TiO_2$ as additives. In this case, the $SnO_2$ and $TiO_2$ may be originally $SnO_2$ and $TiO_2$, respectively, or may be compounds which, when sintered, turn into $SnO_2$ and $TiO_2$, respectively. When any one of these oxides or compounds is added alone by itself, the amount of addition is set to range as above described in terms of mass ratio with the amount converted into $SnO_2$ and $TiO_2$. When both of the oxides or compounds are added in combination, the total amount of addition is desirably set to range from 0.02 to 4.0 mass % in terms of mass ratio with the amount converted into $SnO_2$ and $TiO_2$.

The components of $SnO_2$ and $TiO_2$ are effective in decreasing the residual magnetic flux density, thereby decreasing the hysteresis loss. Too small amount of addition of the components lessens the effectiveness, and too large amount of addition causes the complex relative permittivity ε at 1 MHz to increase. Therefore, the amount of addition is desirably set to range as above defined.

The Mn—Zn ferrite of the present invention may contain, in addition to the basic components with or without any one of the two preceding additive groups, at least one of 0.01 to 2.0 mass % each CuO, NiO, MgO, CoO, $Al_2O_3$, and $Cr_2O_3$ as additives. In this case, the CuO, NiO, MgO, CoO, $Al_2O_3$, and $Cr_2O_3$ may be originally CuO, NiO, MgO, CoO, $Al_2O_3$, and $Cr_2O_3$, respectively, or may be compounds which, when sintered, turn into CuO, NiO, MgO, CoO, $Al_2O_3$, and $Cr_2O_3$, respectively. When any one of these oxides or compounds is added alone by itself, the amount of addition is set to range as above described in terms of mass ratio with the amount converted into CuO, NiO, MgO, CoO, $Al_2O_3$, and $Cr_2O_3$. When at least two of the oxides or compounds are added in combination, the total amount of addition is desirably set to range from 0.06 to 2.0 mass % in terms of mass ratio with the amount converted into CuO, NiO, MgO, CoO, $Al_2O_3$, and $Cr_2O_3$.

The components of CuO, NiO, and MgO are effective in decreasing the complex relative permittivity ε at 1 MHz, thereby decreasing the eddy current loss. Too small amount of addition of the components lessens the effectiveness, and too large amount of addition not only causes the initial permeability to significantly decrease but also causes the dielectric loss tan δ at 1 kHz to increase. Therefore, the amount of addition is desirably set to range as above defined.

The component of CoO is effective in decreasing the complex relative permittivity ε at 1 MHz, thereby decreasing the eddy current loss. $Co^{2+}$, when dissolved at B site of spinel, has a positive crystal magnetic anisotropy and renders the entire crystal magnetic anisotropy to zero, thereby increasing the initial permeability and decreasing the hysteresis loss. Too small amount of addition of the component lessens the effectiveness, and too large amount of addition causes the positive crystal magnetic anisotropy and the magneto-striction to significantly increase, thereby deteriorating the magnetic properties. Therefore, the amount of addition is desirably set to range as above defined.

The component of $Al_2O_3$ is effective in decreasing the complex relative permittivity ε at 1 MHz, thereby decreasing the eddy current loss. Too small amount of addition of the component lessens the effectiveness, and too large amount of addition not only causes the sinterability to deteriorate but also causes the dielectric loss tan δ at 1 kHz to increase. Therefore, the amount of addition is desirable set to range as above defined.

The component of $Cr_2O_3$ is effective in decreasing the complex relative permittivity $\epsilon$ at 1 MHz, thereby decreasing the eddy current loss. $Cr^{3+}$, when dissolved at B site of spinel, has a positive crystal magnetic anisotropy, though slight, and renders the entire crystal magnetic anisotropy to zero, thereby increasing the initial permeability and decreasing the hysteresis loss. Too small amount of addition of the component lessens the effectiveness, and too large amount of addition not only causes the sinterability to deteriorate but also causes the dielectric loss tan δ at 1 kHz to increase. Therefore, the amount of addition is desirably set to range as above defined.

The Mn—Zn ferrite of the present invention may further contain other additives generally used in Mn—Zn ferrite, such as $Ta_2O_5$, $HfO_2$, $Nb_2O_5$, $Bi_2O_3$, $In_2O_3$, $MoO_3$, and $WO_3$.

In manufacturing the Mn—Zn ferrite, raw material powders of basic components $Fe_2O_3$, ZnO, and MnO are weighed for a prescribed composition, mixed, calcined, and finely milled. The temperature for calcination is appropriately set to range from 800 to 1,000° C. depending on the composition. The fine milling can be conducted with a general-purpose ball mill. When additives such as CaO, $SiO_2$, $V_2O$, $SnO_2$, $TiO_2$, CuO, NiO, MgO, CoO, $Al_2O_3$, and $Cr_2O_3$ are used, powders of the additives in respective suitable amounts are added to the powder finely milled and mixed to obtain a mixture with a composition targeted. The mixture is granulated and pressed in accordance with a usual ferrite production process, then sintered at 900 to 1,400° C. The granulation process can be conducted by adding a binder such as polyvinyl alcohol, polyacrylamide, methylcellulose, polyethylene oxide, or glycerol, and the pressing process can be conducted by applying a pressure of, or example, 80 MPa or more. The sintering and the cooling thereafter are conducted in an atmosphere containing a suitable amount of oxygen or in an atmosphere having a relative partial pressure of oxygen prescribed in accordance with the aforementioned expression (1).

A Mn—Zn ferrite thus obtained and a coil component having a magnetic core made thereof have a low core loss and a small electrical connection between a coil and a core in a high frequency band above 1 MHz, and further above 5 MHz, thereby providing an increased range of application.

EXAMPLES

Example 1

Raw material powders of $Fe_2O_3$, ZnO and MnO as basic components were weighed for a composition of 43.0 to 52.0 mol %, 10.5 mol %, and the remainder, respectively, mixed with a ball mill, calcined in the air at 850° C. for 2 hours, and milled with a ball mill for 20 hours, and a fine milled powder was obtained. The fine milled powder had its components adjusted so as to obtain the above-mentioned composition, and mixed with a ball mill for 1 hour to obtain a mixture. The mixture was granulated with addition of polyvinyl alcohol, and pressed at a pressure of 80 MPa into toroidal cores (green cores), each of which, after sintering, had an outer diameter of 25 mm, an inner diameter of 15 mm and height (thickness) of 5 mm. The green cores were placed in a sintering furnace where an atmosphere was adjusted by flowing nitrogen so as to have oxygen concentration to be obtained by setting the constant b of the expression (1) to 8, were sintered at 1, 150° C. for 3 hours and then cooled therein, and samples (Mn—Zn ferrite) 1-1 to 1-6 shown in Table 1 were obtained. For reference purpose, a mixed powder consisting of raw material powders of 48.0 mol % $Fe_2O_3$, 26.5 mol % ZnO, 7.0 mol % CuO, and remainder MnO was subjected to the same processes as above mentioned except sintering in the air, and a sample (Ni—Zn ferrite ) 1-7 was obtained.

Regarding the samples 1-1 to 1-7, initial permeability and dielectric loss tan δ at 1 kHz, complex relative permittivity $\epsilon$ at 1 MHz, and core loss (kw/m³) at 1 MHz and 5 MHz (25 mT and 80° C.) were measured. The results are shown in Table 1. In Table, the samples are classified into "Invention" following the present invention, and "Comparison" not following the present invention. This classification is used also in Tables 2 to 4.

TABLE 1

| Sample | | Basic component composition (mol %) | | | Initial permeability | Dielectric loss | Complex relative permittivity | Core loss (kW/m³) 25 mT, 80° C. | |
|---|---|---|---|---|---|---|---|---|---|
| No. | Classification | $Fe_2O_3$ | ZnO | MnO | 1 kHz | 1 kHz | 1 MHz | 1 MHz | 5 MHz |
| 1-1 | Comparison | 52.00 | 10.50 | Remainder | 1200 | 0.51 | 10126 | 373 | 3562 |
| 1-2 | Comparison | 50.00 | 10.50 | Remainder | 670 | 0.29 | 989 | 301 | 987 |
| 1-3 | Invention | 48.00 | 10.50 | Remainder | 475 | 0.25 | 879 | 312 | 922 |
| 1-4 | Invention | 46.00 | 10.50 | Remainder | 356 | 0.23 | 758 | 351 | 901 |
| 1-5 | Invention | 44.00 | 10.50 | Remainder | 340 | 0.21 | 527 | 368 | 892 |
| 1-6 | Comparison | 43.00 | 10.50 | Remainder | 110 | 0.19 | 426 | 421 | 853 |

| Sample | | Basic component composition (mol %) | | | | Initial permeability | Dielectric loss | Complex relative permittivity | Core loss (kW/m³) 25 mT, 80° C. | |
|---|---|---|---|---|---|---|---|---|---|---|
| No. | Classification | $Fe_2O_3$ | ZnO | CuO | NiO | 1 kHz | 1 kHz | 1 MHz | 1 MHz | 5 MHz |
| 1-7 | Comparison | 48.00 | 26.50 | 7.00 | Remainder | 412 | 0.10 | 13 | 2136 | 5423 |

As shown in Table 1, invention samples 1-3, 1-4 and 1-5 containing less than 50.0 mol % $Fe_2O_3$ have a significantly smaller dielectric loss tan δ at 1 kHz and complex relative permittivity $\epsilon$ at 1 MHz than a comparison sample 1-1 containing 52.0 mol % $Fe_2O_3$, and accordingly have a decreased core loss at 1 MHz and 5 MHz. A comparison sample 1-6 containing 43.1 mol % $Fe_2O_3$ has a core loss comparable to that of the invention samples 1-3, 1-4 and 1-5, but has a significantly decreased initial permeability. A comparison sample (Ni—Zn for reference purpose) 1-7 has a significantly smaller dielectric loss tan δ at 1 kHz and complex relative permittivity ε at 1 MHz than the invention samples 1-3, 1-4 and 1-5, but has a significantly increased core loss at 1 MHz and 5 MHz.

Example 2

Raw material powders of $Fe_2O_3$, ZnO and MnO as basic components were weighed for a composition of 48.0 mol %, 10.5 mol %, and the remainder, respectively, mixed together with at least one of CaO and $V_2O_5$ added in an appropriate amount using a ball mill, calcined in the air at 850° C. for 2 hours, and milled with a ball mill for 20 hours, and a fine milled powder was obtained. The fine milled powder had its components adjusted so as to obtain the above-mentioned composition, and mixed with a ball mill for 1 hour to obtain a mixture. The mixture was granulated with addition of polyvinyl alcohol, and pressed at a pressure of 80 MPa into toroidal cores (green cores), each of which, after sintering, had an outer diameter of 25 mm, an inner diameter of 15 mm and height (thickness) of 5 mm. The green cores were placed in a sintering furnace where an atmosphere was adjusted by flowing nitrogen so as to have oxygen concentration to be obtained by setting the constant b of the expression (1) to 8, were sintered at 1,150° C. for 3 hours and then cooled therein, and samples 2-1 to 2-6 shown in Table 2 were obtained.

Regarding the samples 2-1 to 2-6, dielectric loss tan δ at 1 kHz, complex relative permittivity ε at 1 MHz, and core loss (kw/m³) at 1 MHz and 5 MHz (25 mT and 80° C.) were measured. The results are shown in Table 2. Table 2 includes the invention sample 1-3 of Example 1.

As shown in Table 2, invention samples 2-1 to 2-4 containing an appropriate amount of at least one of CaO and $V_2O_5$ have a smaller dielectric loss tan δ at 1 kHz than the invention sample 1-3 containing no additives, and accordingly have a decreased core loss at 1 MHz and 5 MHz. Comparison samples 2-5 and 2-6 containing the additives in a large amount have a decreased dielectric loss tan δ at 1 kHz but have a significantly increased complex relative permittivity ε at 1 MHz, and resultingly have a significantly increased core loss especially at 5 MHz.

Example 3

Raw material powders of $Fe_2O_3$, ZnO and MnO as basic components were weighed for a composition of 48.0 mol %, 10.5 mol %, and the remainder, respectively, mixed together with at least one of $SnO_2$ and $TiO_2$ added in an appropriate amount using a ball mill, calcined in the air at 850° C. for 2 hours, and milled with a ball mill for 20 hours, and a fine milled powder was obtained. The fine milled powder had its components adjusted so as to obtain the above-mentioned composition, and mixed with a ball mill for 1 hour to obtain a mixture. The mixture was granulated with addition of polyvinyl alcohol, and pressed at a pressure of 80 MPa into toroidal cores (green cores), each of which, after sintering, had an outer diameter of 25 mm, an inner diameter of 15 mm and height (thickness) of 5 mm. The green cores were placed in a sintering furnace where an atmosphere was adjusted by flowing nitrogen so as to have oxygen concentration to be obtained by setting the constant b of the expression (1) to 8, were sintered at 1,150° C. for 3 hours and then cooled therein, and samples 3-1 to 3-6 shown in Table 3 were obtained.

Regarding the samples 3-1 to 3-6, dielectric loss tan δ at 1 kHz, complex relative permittivity ε at 1 MHz, and core loss (kw/m³) at 1 MHz and 5 MHz (25 mT and 80° C.) were measured. The results are shown in Table 3. Table 3 includes the invention sample 1-3 of Example 1.

TABLE 2

| Sample | | Basic component Composition (mol %) | | | Additive | | Dielectric loss | Complex relative permittivity | Core loss (kW/m³) 25 mT, 80° C. | |
|---|---|---|---|---|---|---|---|---|---|---|
| No. | Classification | $Fe_2O_3$ | ZnO | MnO | Name | Amount (mass %) | 1 kHz | 1 MHz | 1 MHz | 5 MHz |
| 1-3 | Invention | 48.00 | 10.50 | Remainder | — | — | 0.25 | 879 | 312 | 922 |
| 2-1 | Invention | 48.00 | 10.50 | Remainder | CaO | 0.10 | 0.10 | 958 | 173 | 670 |
| 2-2 | Invention | 48.00 | 10.50 | Remainder | $SiO_2$ | 0.01 | 0.19 | 892 | 262 | 823 |
| 2-3 | Invention | 48.00 | 10.50 | Remainder | $V_2O_5$ | 0.05 | 0.20 | 885 | 215 | 716 |
| 2-4 | Invention | 48.00 | 10.50 | Remainder | CaO + $SiO_2$ | 0.20 | 0.07 | 995 | 152 | 623 |
| 2-5 | Comparison | 48.00 | 10.50 | Remainder | CaO | 0.30 | 0.05 | 1458 | 335 | 2459 |
| 2-6 | Comparison | 48.00 | 10.50 | Remainder | $SiO_2$ + $V_2O_5$ | 0.40 | 0.02 | 2153 | 352 | 2895 |

TABLE 3

| Sample | | Basic component composition (mol %) | | | Additive | | Dielectric loss | Complex relative permittivity | Core loss (kW/m³) 25 mT, 80° C. | |
|---|---|---|---|---|---|---|---|---|---|---|
| No. | Classification | $Fe_2O_3$ | ZnO | MnO | Name | Amount (mass %) | 1 kHz | 1 MHz | 1 MHz | 5 MHz |
| 1-3 | Invention | 48.00 | 10.50 | Remainder | — | — | 0.25 | 879 | 312 | 922 |
| 3-1 | Invention | 48.00 | 10.50 | Remainder | $SnO_2$ | 1.00 | 0.24 | 912 | 216 | 925 |
| 3-2 | Invention | 48.00 | 10.50 | Remainder | $TiO_2$ | 2.00 | 0.23 | 972 | 153 | 932 |
| 3-3 | Invention | 48.00 | 10.50 | Remainder | $SnO_2$ + $TiO_2$ | 3.00 | 0.24 | 988 | 124 | 953 |
| 3-4 | Comparison | 48.00 | 10.50 | Remainder | $SnO_2$ | 5.00 | 0.22 | 1564 | 324 | 2019 |
| 3-5 | Comparison | 48.00 | 10.50 | Remainder | $TiO_2$ | 4.00 | 0.23 | 1237 | 318 | 1798 |

TABLE 3-continued

| Sample | | Basic component composition (mol %) | | | Additive | | Dielectric loss | Complex relative permittivity | Core loss (kW/m³) 25 mT, 80° C. | |
|---|---|---|---|---|---|---|---|---|---|---|
| No. | Classification | Fe₂O₃ | ZnO | MnO | Name | Amount (mass %) | 1 kHz | 1 MHz | 1 MHz | 5 MHz |
| 3-6 | Comparison | 48.00 | 10.50 | Remainder | SnO₂ + TiO₂ | 5.00 | 0.21 | 1498 | 382 | 1892 |

As shown in Table 3, invention samples 3-1 to 3-3 containing an appropriate amount of at least one of SnO₂ and TiO₂ have a dielectric loss tan δ at 1 kHz, a complex relative permittivity ε at 1 MHz, and a core loss (kw/m³) at 5 MHz comparable to those of the invention sample 1-3 containing no additives, but have a significantly smaller core loss at 1 MHz. This is attributed to a decrease in hysteresis loss. Comparison samples 3-4 to 3-6 containing the additives in a large amount have a complex relative permittivity ε at 1 MHz significantly increased, and resultingly have a significantly increased core loss especially at 5 MHz.

loss (kw/m³) at 1 MHz and 5 MHz (25 mT and 80° C.) were measured. The results are shown in Table 4. Table 4 includes the invention sample 1-3 of Example 1.

TABLE 4

| Sample | | Basic component composition (mol %) | | | Additive | | Dielectric loss | Complex relative permittivity | Core loss (kW/m³) 25 mT, 80° C. | |
|---|---|---|---|---|---|---|---|---|---|---|
| No. | Classification | Fe₂O₃ | ZnO | MnO | Name | Amount (mass %) | 1 kHz | 1 MHz | 1 MHz | 5 MHz |
| 1-3 | Invention | 48.00 | 10.50 | Remainder | — | — | 0.25 | 879 | 312 | 922 |
| 4-1 | Invention | 48.00 | 10.50 | Remainder | CuO | 0.50 | 0.26 | 752 | 292 | 795 |
| 4-2 | Invention | 48.00 | 10.50 | Remainder | NiO | 1.00 | 0.27 | 623 | 290 | 682 |
| 4-3 | Invention | 48.00 | 10.50 | Remainder | MgO | 1.20 | 0.28 | 601 | 286 | 675 |
| 4-4 | Invention | 48.00 | 10.50 | Remainder | Al₂O₃ | 1.50 | 0.27 | 589 | 284 | 623 |
| 4-5 | Invention | 48.00 | 10.50 | Remainder | CoO | 1.00 | 0.28 | 612 | 121 | 523 |
| 4-6 | Invention | 48.00 | 10.50 | Remainder | Cr₂O₃ | 2.00 | 0.29 | 524 | 118 | 502 |
| 4-7 | Invention | 48.00 | 10.50 | Remainder | MgO + CoO | 1.00 + 0.50 | 0.29 | 576 | 201 | 573 |
| 4-8 | Comparison | 48.00 | 10.50 | Remainder | CoO | 3.00 | 0.76 | 425 | 789 | 1598 |
| 4-9 | Comparison | 48.00 | 10.50 | Remainder | NiO + MgO | 2.00 + 2.50 | 0.85 | 389 | 932 | 2015 |

Example 4

Raw material powders of Fe₂O₃, ZnO and MnO as basic components were weighed for a composition of 48.0 mol %, 10.5 mol %, and the remainder, respectively, mixed together with at least one of CuO, NiO, MgO, CoO, Al₂O₃, and Cr₂O₃ added in an appropriate amount using a ball mill, calcined in the air at 850° C. for 2 hours, and milled with a ball mill for 20 hours, and a fine milled powder was obtained. The fine milled powder had its components adjusted so as to obtain the above-mentioned composition, and mixed with a ball mill for 1 hour to obtain a mixture. The mixture was granulated with addition of polyvinyl alcohol, and pressed at a pressure of 80 MPa into toroidal cores (green cores), each of which, after sintering, had an outer diameter of 25 mm, an inner diameter of 15 mm and height (thickness) of 5 mm. The green cores were placed in a sintering furnace where an atmosphere was adjusted by flowing nitrogen so as to have oxygen concentration to be obtained by setting the constant b of the expression (1) to 8, were sintered at 1,150° C. for 3 hours and then cooled therein, and samples 4-1 to 4-9 shown in Table 4 were obtained.

Regarding the samples 4-1 to 4-9, dielectric loss tan δ at 1 kHz, complex relative permittivity ε at 1 MHz, and core As shown in Table 4, invention samples 4-1 to 4-4 containing an appropriate amount of at least one of CuO, NiO, MgO, and Al₂O₃, have a smaller complex relative permittivity ε at 1 MHz than the invention sample 1-3 containing no additives, and resultingly have a decreased core loss (kw/m³) especially at 5 MHz. Invention samples 4-5 and 4-7 containing at least one of CoO and Cr₂O₃ in an appropriate amount have a smaller core loss at 1 MHz and 5 MHz. This is attributed to a decrease in hysteresis loss and a decrease in complex relative permittivity ε at 1 MHz. Comparison samples 4-8 and 4-9 containing the additives in a large amount have an increased complex relative permittivity ε at 1 MHz, but have a significantly increased dielectric loss tan δ at 1 kHz, and resultingly have a significantly increased core loss at 1 MHz and 5 MHz.

As described above, the Mn—Zn ferrite and the coil component according to the present invention have a low core loss in a high frequency band above 1 MHz and even above 5 MHz, and therefore can duly function in that high frequency band. Also, the electrical connection between a coil and a core is reduced, whereby heat generation and skew of signal waveform can be held down.

What is claimed is:

1. A coil component comprising a core of a Mn—Zn ferrite containing as basic components 44.0 to 50.0 mol % (50.0 mol % excluded) Fe₂O₃, 4.0 to 26.5 mol % ZnO, and remainder MnO, and having a dielectric loss tan δ of 0.3 or less at 1 kHz, and a complex relative permittivity ε of 1,000 or less at 1 MHz, wherein the Mn—Zn ferrite is a body that has been sintered in atmosphere having an oxygen concentration obtained according to the following expression:

$$\log PO_2 = \{-14{,}540/(T+273)\} + b$$

in which T is temperature (° C), $PO_2$ is relative partial pressure of oxygen and b is a constant ranging from 6 to 21; and further containing as additives at least one of 0.01 to 0.2 mass % CaO, 0.005 to 0.05 mass % $SiO_2$, and 0.01 to 0.1 mass % $V_2O_5$, with a total content of 0.02 to 0.2 mass % when two or more thereof are contained.

2. The coil component comprising a core that comprises a Mn—Zn ferrite according to claim 1, further containing as additives at least one of 0.01 to 4.0 mass % $SnO_2$, and 0.01 to 3.0 mass % $TiO_2$, with a total content not exceeding 4.0 mass % when both thereof are contained.

3. The coil component comprising a core that comprises a Mn—Zn ferrite according to claim 1, further containing as additives at least one of 0.01 to 2.0 mass % CuO, 0.01 to 2.0 mass % NiO, 0.01 to 2.0 mass % MgO, 0.01 to 2.0 mass % CoO, 0.01 to 2.0 mass % $Al_2O_3$, and 0.01 to 2.0 mass % $Cr_2O_3$, with a total content of 0.06 to 2.0 mass % when two or more thereof are contained.

4. The coil component comprising a core that comprises a Mn—Zn ferrite according to claim 2, further containing as additives at least one of 0.01 to 2.0 mass % CuO, 0.01 to 2.0 mass % NiO, 0.01 to 2.0 mass % MgO, 0.01 to 2.0 mass% CoO, 0.01 to 2.0 mass % $Al_2O_3$, and 0.01 to 2.0 mass % $Cr_2O_3$, with a total content of 0.06 to 2.0 mass % when two or more thereof are contained.

* * * * *